United States Patent
Mobbs et al.

(10) Patent No.: US 8,234,344 B2
(45) Date of Patent: Jul. 31, 2012

(54) PROVIDING ANALYTICAL VIEW OF EMAIL INFORMATION

(75) Inventors: David Mobbs, Vitry sur Seine (FR); Pierre-Emmanuel Gros, Paris (FR)

(73) Assignee: Business Objects S.A., Levallois-Perret (FR)

( * ) Notice: Subject to any disclaimer, the term of this patent is extended or adjusted under 35 U.S.C. 154(b) by 342 days.

(21) Appl. No.: 12/436,144

(22) Filed: May 6, 2009

(65) Prior Publication Data
US 2010/0287176 A1    Nov. 11, 2010

(51) Int. Cl.
*G06F 15/16* (2006.01)
(52) U.S. Cl. ...................................................... 709/206
(58) Field of Classification Search .................. 709/206, 709/207; 707/765
See application file for complete search history.

(56) References Cited

U.S. PATENT DOCUMENTS

| | | | | |
|---|---|---|---|---|
| 2008/0104039 | A1* | 5/2008 | Lowson | 707/3 |
| 2009/0222917 | A1* | 9/2009 | Mills et al. | 726/22 |
| 2009/0327852 | A1* | 12/2009 | MacGregor et al. | 715/214 |
| 2010/0017487 | A1* | 1/2010 | Patinkin | 709/206 |
| 2010/0030798 | A1* | 2/2010 | Kumar et al. | 707/102 |
| 2010/0082758 | A1* | 4/2010 | Golan | 709/206 |
| 2010/0223581 | A1* | 9/2010 | Manolescu et al. | 715/853 |
| 2010/0250412 | A1* | 9/2010 | Wagner | 705/31 |

OTHER PUBLICATIONS

Xobni; Xobni User Manual; http://www.xobni.com/support/; Mar. 25, 2009; v1.7.3/Build 6685; Xobni; San Francisco, USA.

* cited by examiner

*Primary Examiner* — Jason Recek (57) ABSTRACT

Described are methods and systems related to providing an analytical view of information present in one or more emails. Metadata of all the emails present in a mailbox is configured. The metadata includes an attribute of a corresponding email. Based upon the attributes of the emails, a relationship map is created. The relationship map is a multidimensional structure having multiple axes, with each axis describing an attribute of the emails. A query is received to query the mailbox. The query received is parsed to identify attributes of one or more relevant emails that are associated with the received query. A value is computed for each attribute of the relevant emails. Based upon the values computed for each attribute present in the relationship map, a resulting report having analytical view of information present in the relevant emails is rendered.

16 Claims, 7 Drawing Sheets

PROVIDING ANALYTICAL VIEW OF EMAIL INFORMATION

FIELD OF THE INVENTION

Embodiments of the invention generally relate to the field of viewing email information, and more particularly they relate to methods and systems for providing an analytical view of email information.

BACKGROUND OF THE INVENTION

Typically, emails contain a large amount of business information. In some situations, emails are crossed referenced. For instance, an accountant working on tax computations for employees of a particular country may access a tax computation database that contains a lot of information, including tax laws of each country, computation details of employees of each country and the like. Not all the email exchanges performed by the accountant are related to tax computations. If there is a need to view all the emails exchanged related to tax computation for a particular employee in a given period, or for a particular country, all the emails need to be accessed, classified and analyzed. This is mostly achieved by sorting emails to relevant folders.

There is a need to bridge the gap that exists between the information present in emails and the analysis of this information. To bridge this gap, the information present in the emails have to accessible to users, and this information has to be analyzed and presented such that essential information is available independent of the properties of the emails.

SUMMARY OF THE INVENTION

Described are methods and systems related to providing an analytical view of information present in one or more emails. Metadata is configured for the emails present in a mailbox. The metadata includes attributes of the emails, that describe one or more dimensions and corresponding one or more measures associated with the emails. Based upon the attributes of the emails, a relationship map is created. The relationship map is a multidimensional structure, including multiple axes, with each axis describing an attribute of the emails. A query may be received to query the mailbox. The received query is parsed to identify attributes of one or more relevant emails associated with the received query. The relevant emails are identified based upon an association of the attributes present in the relationship map with the received query. Based upon the received query, a value is computed for each attribute of the relevant emails present in the relationship map. This is achieved by computing a value for each dimension and corresponding measure of each relevant email. Based upon the value computed, a resulting report, including an analytical view of information present in the relevant emails, is rendered.

In an embodiment, a relational data warehouse is created based upon the attributes of the relevant emails. The relational data warehouse represents a structural distribution of attributes of the relevant emails. Based upon the attributes of the relevant emails in the relational data warehouse, the resulting report is rendered.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with their advantages, may be best understood from the following detailed description taken in conjunction with the accompanying drawings. The invention is illustrated by the way of example and not by the way of limitation in the figures of the accompanying drawings. It should be noted that references to "an" or "one" embodiment in this disclosure are not necessarily to the same embodiment, and such references mean at least one.

DETAILED DESCRIPTION

An analytical view of any information may be described as viewing the information in an intuitive manner that is independent from an application or a program in which the information is residing. The analytical view of information enables selecting a set of necessary features and analyzing the information for the selected features, to make decisions related to the information. Providing an analytical view of information of various emails present in a mailbox enables selecting essential attributes of the emails and analyzing email data for the selected attributes. Providing the analytical view of information present in various emails renders a multidimensional conceptual view of the information. The conceptual view supplies an abstract of the contents of the email along with its attributes, thereby simplifying access to the information embedded in the emails, and facilitating decision-making activity by comparing the conceptual view of information with other reports.

Typically, the emails are stored in a mailbox server. The mailbox server may also hold metadata of the emails that are created based upon information present in the emails. The metadata of all the emails present in the mailbox are configured. In an embodiment, the metadata of all the emails present in the mailbox server are configured based upon a user input. The metadata may be configured based upon the information of one or more emails that the user requires to make a business decision. Configuring the metadata may include creating the metadata based upon information present in email or based upon a user input, or based upon one or more terms present in the query, and the like. The metadata of each email usually includes information related to that email, for instance, one or more attributes associated with that email. The attributes of each email include one or more dimensions and corresponding measures associated with the email.

A dimension represents a group of one or more enumerable business objects like products, people, financial elements, and time. For example, an email may be viewed in dimensions of a sender, a recipient, a subject, a date, a sent time, a received time, an email conversation, and the like. Some emails may also include custom dimensions, derived based upon contents found in the subject or body of the email. Dimensions like project type, and a team responsible for such a project type may be derived.

A measure or a metric is a quantity as ascertained by comparison with a standard, usually denoted in some metric, for example, units sold and dollars. A measure, such as sales revenue, can be displayed for dimension customer, product and geography. A measure may be a quantity that is determined by comparison with a standard, usually denoted in some metric, like "units sold". For instance, measure "conversation count" can be displayed for dimension "email conversations". Other measures may include email count, recipient count and the like. Some emails may also include custom measures derived based upon the contents found in the subject or body of the email. For instance, if the messages contain text like "sales amount: $X", a "sales amount" measure can be created. A measure may be a resultant of an aggregation of identical measures for a dimension. For instance, measure "revenue" may be displayed for dimension "year". Here, the measure describes an aggregation of all the revenues for all the years. A measure can also be displayed for each of the values within a dimension. A value may be described as a quantity (for example, numeric quantity) that has been defined for a particular attribute in the email. For instance, for the attribute "sales amount: $100", the value is "100".

Based upon the attributes of the emails, a relationship map is created. The relationship map is a multidimensional structure, having multiple axes. The multidimensional structure allows storing information by summarizing the contents of the relevant emails and presenting the contents in accordance with the attributes of the relevant emails. The multidimensional structure may be described as a data cube that represents the information available to the user in various dimensions. Each axis in the data cube represents data from the dimensions such as sender, recipient, send time, subject of the emails, and the like. Each axis may be described as a space along which the information of the relevant emails is arranged. The axis contains a sequence of business entities that qualify as dimensions. The axis may also contain some indicators about the order in which each dimension should be specified. For example, for a dimension "email conversation", the indicator may be "received order". All the axes together (for example x-axis, y-axis and z-axis) define the coordinates of the data cube. Each axis of the relationship map, thus, describes an attribute of the emails present in the mailbox.

Creating a relationship map involves mapping attributes of the emails present in the mailbox server, to the axes of the relationship map. Creating a relationship map may also involve identifying the values described for each attribute in the emails, and mapping the identified values on the corresponding axes of the multidimensional structure, that represent the attribute in the relationship map. For instance, x-axis of the cube may represent a dimension "subject of email", y-axis may represent "date of receipt" of the email, and z-axis may represent "sender of email". The values that are associated with "subject of emails" for example, are mapped on x-axis, the values that are associated with "date of receipt" are mapped on y-axis and the values that are associated with "sender of email" are mapped on z-axis. For instance, the emails present in the mailbox server may be scanned, and using the configured metadata of each of the emails the respective attributes are retrieved. Values associated with the retrieved attributes are positioned on the cube, on the corresponding axes.

A user may provide a query for querying the mailbox and identify relevant emails from a group of emails present in the mailbox. The query is parsed to identify the relevant emails from the group of emails present in the mailbox, with attributes of each of the emails being mapped to a relationship map. The relevant emails are identified based upon an association of the attributes present in the relationship map with the received query. For instance, one or more terms provided by the query are compared with the metadata of each of the emails present in the mailbox server, to obtain one or more relevant emails that are associated with the terms provided by the query. The relevant emails and/or the corresponding metadata of the relevant emails may include information that is identical to terms provided by the query. A search may be performed to retrieve the relevant emails from the mailbox server. Identifying the relevant emails involves identifying one or more attributes associated with each relevant email. One or more dimensions and corresponding one or more measures of each attribute of the relevant email are determined. The attribute of the relevant email resides in the metadata of the corresponding email.

Based upon the received query, a value is computed for each attribute of the relevant emails, by computing a value for each dimension and corresponding measure of the corresponding attribute of each of the relevant emails. The value may be described as a quantity that has been specified for a particular dimension or its corresponding measure, in the email. For instance, for a dimension "subject of the email" the value computed may be "project ABC". The value is computed based upon the terms in the query, for example "emails related to project ABC". For example, considering an email having the following information: "Date—1 Apr. 2009"; "Subject—Customer XYZ deal", "Body—Hi Bill, The deal is done! Amount: $50000. Regards, Steve"; dimensions such as subject and date may be extracted directly from the subject and the date of the mail. However, the metadata configured for the email may be used to extract other dimensions like customer name and amount. The values of each of the dimensions are thus computed, and the relationship map is correspondingly updated with the computed values. Once the values are computed, the aggregations of necessary measures of dimensions or values may be performed along the axes. For instance, if geographical locations (for eg. France, America, India) of all the customers are mapped to x-axis of the relationship map, the total number of customers for a particular geographical location (for eg. America) may be computed based upon an aggregation of values for that location, from the x-axis of the relationship map. Based upon the computed values in the relationship map, a resulting report including an analytical view of the information present in the relevant emails is rendered. The resulting report generally describes information present in the relationship map as a pictorial representation, a graphical representation, a tabular representation and the like.

In an embodiment, based upon the attributes of the relevant emails, a relational data warehouse is created. The data warehouse may be created by parsing each of the emails in the mailbox server, and storing values corresponding to each of the emails. In an embodiment, the data warehouse may be created by generating dimensions and corresponding measures for each of the emails stored in the mailbox server. The relational data warehouse provides a complete source of information and infrastructure to build business intelligence solutions. The information present in the relational data warehouse represents a structural distribution of the attributes of the relevant emails. Functions of the relational data warehouse may involve retrieval and analysis of data, extracting data from a repository, transforming the data and managing the data, and analyzing and reporting of the data present in relational data warehouse system. The relational data warehouse is built based upon the dimensions present in the attributes of the emails. Based upon the attributes of the relevant emails in the relational data warehouse, the resulting report including an analytical view of the information present in the relevant emails is rendered.

The information thus presented is easily available for the user to understand and to use. The relational data warehouse gives a conceptual view of the information present in the attributes of the relevant emails. Based upon the information thus available, email information from multiple mailbox servers can be easily reported and analyzed. In addition, by looking at the analyzed information present in such a structural distribution, business decisions about the information may be acquired.

Figure 1:
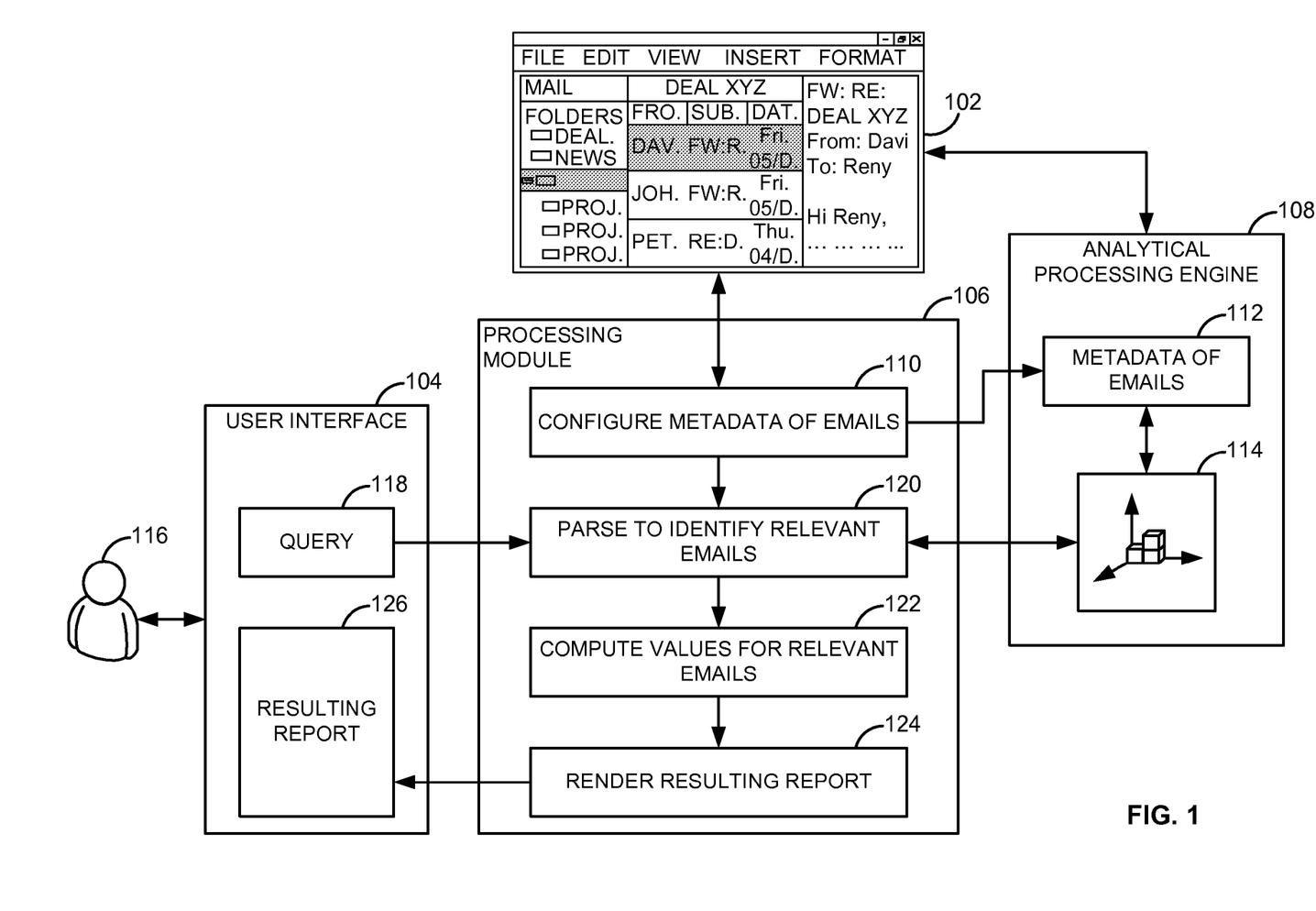
FIG. 1 illustrates a functional block diagram for providing an analytical view of information present in one or more emails, according to an embodiment of the invention.

FIG. 1 illustrates a functional block diagram for providing an analytical view of information present in one or more emails, according to an embodiment of the invention. Processing module 106 configures 110 metadata of emails 112 present in mailbox 102. The metadata 112 includes attributes of the emails, that describe one or more dimensions and corresponding one or more measures associated with the emails. Based upon the attributes of the emails, processing module 106 creates a relationship map 114, and stores the relationship map 114 in analytical processing engine 108. The relationship map is a multidimensional structure, including multiple axes, with each axis describing an attribute of the emails.

User 116 may provide a query 118 on user interface 104, to determine one or more relevant emails from a group of emails present in mailbox 102. Query 118 typically includes terms based upon which user 116 retrieves relevant emails. Query 118 received from user 116 is parsed to identify 120 one or more relevant emails associated with query 118. The relevant emails are identified based upon an association of the attributes present in the relationship map 114 with query 118. Based upon query 118, processing module 106 computes a value 122 for each attribute of each of the relevant emails. Based upon the value computed, processing module 106 renders 124 a resulting report 126 having an analytical view of information present in relevant emails. Resulting report 126 is displayed on user interface 104, where user 116 accesses essential information.

In an embodiment, processing module 106 creates a relational data warehouse, based upon the attributes of the relevant emails. The relational data warehouse represents structural distribution of attributes of the relevant emails. Based upon the attributes of the relevant emails, processing module 106 renders 124 a resulting report 126 having the analytical view of information present in relevant emails. Resulting report 126 is displayed on user interface 104, where user 116 accesses essential information.

Figure 2A:
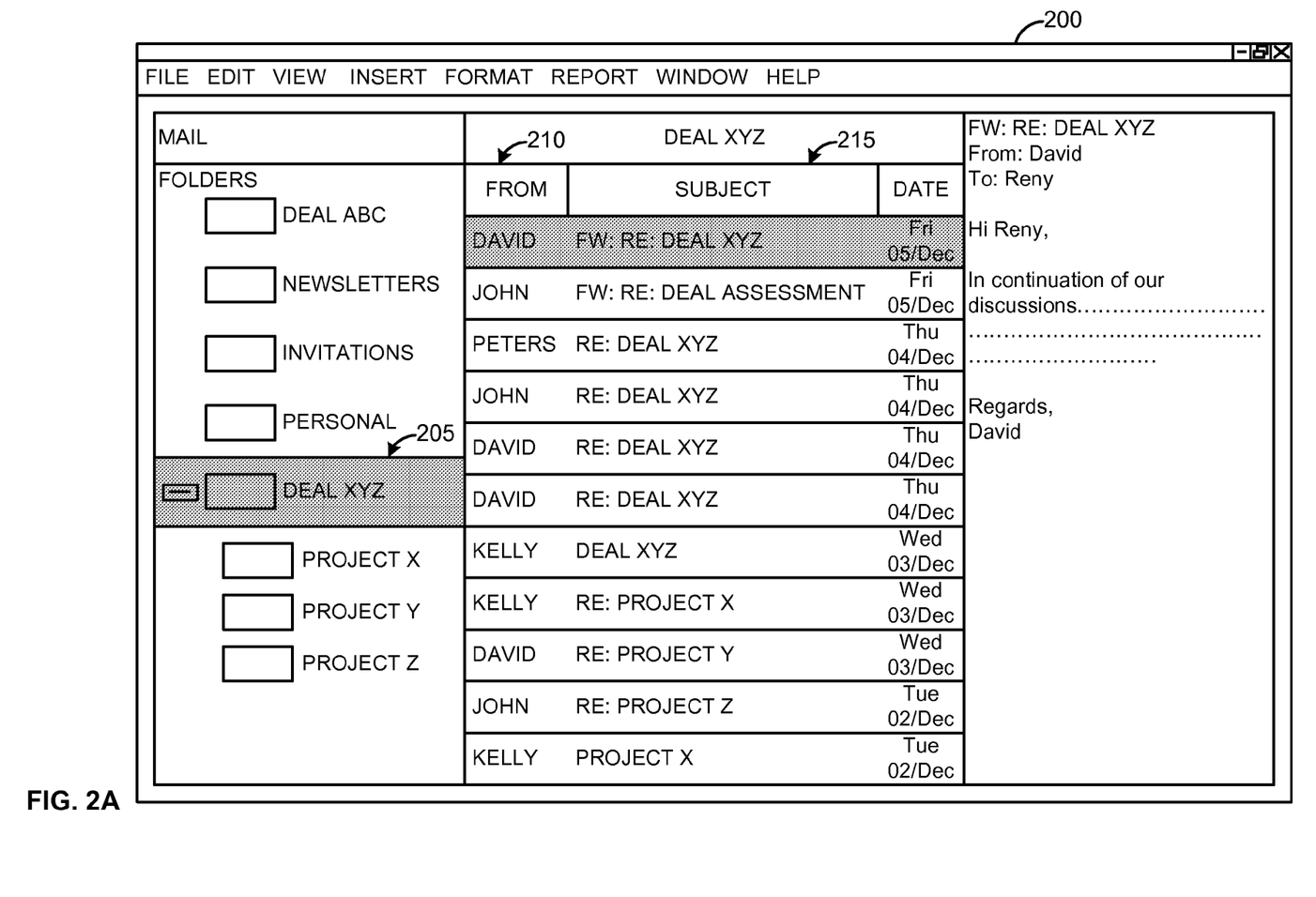
FIG. 2A illustrates an exemplary screen display of a mailbox server, including a set of emails and corresponding attributes of the emails, according to an embodiment of the invention.
Figure 2B:
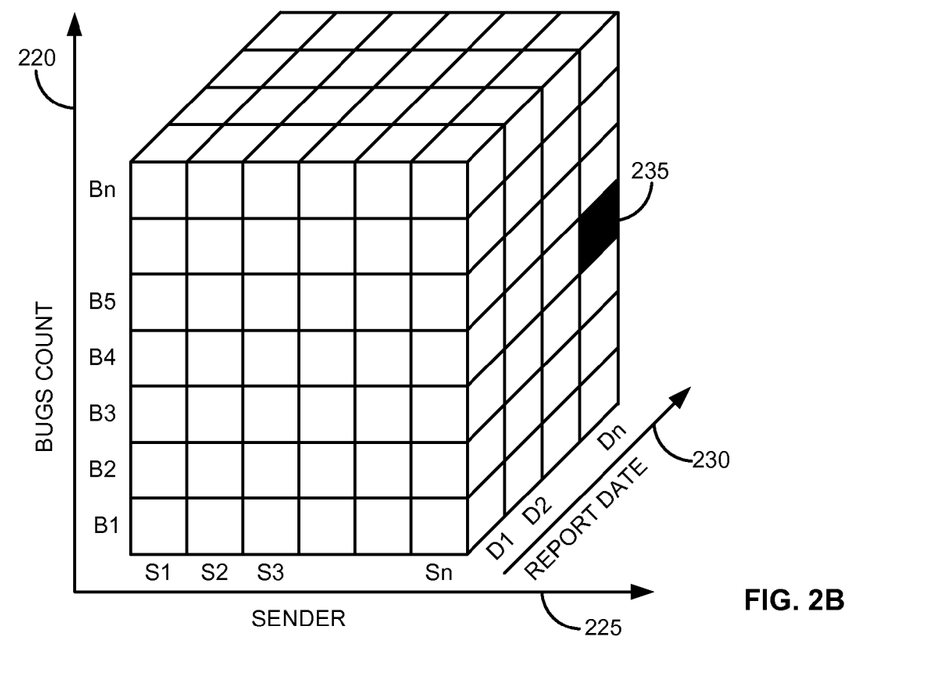
FIG. 2B illustrates an exemplary relationship map, according to an embodiment of the invention.
Figure 2C:
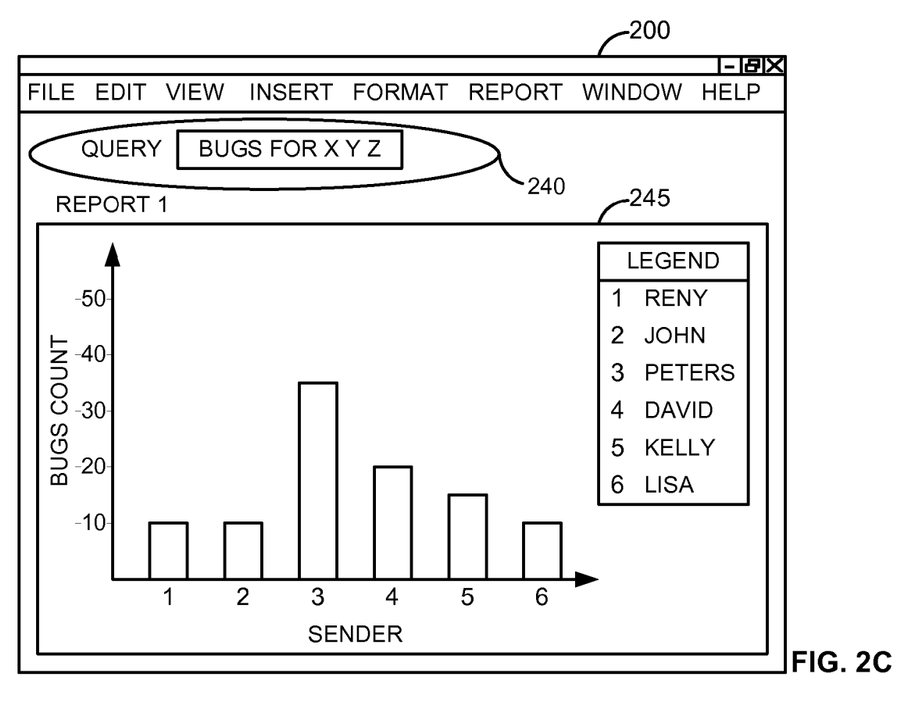
FIGS. 2C, 2D and 2E illustrate exemplary screen displays of a relationship map created based upon attributes of emails, according to an embodiment of the invention.
Figure 2D:
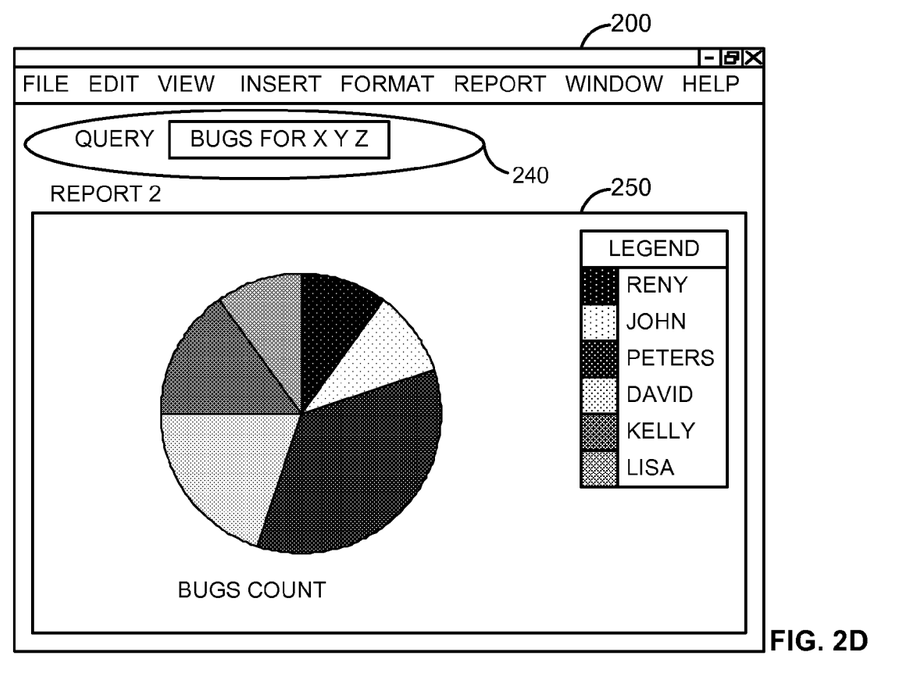
Figure 2E:
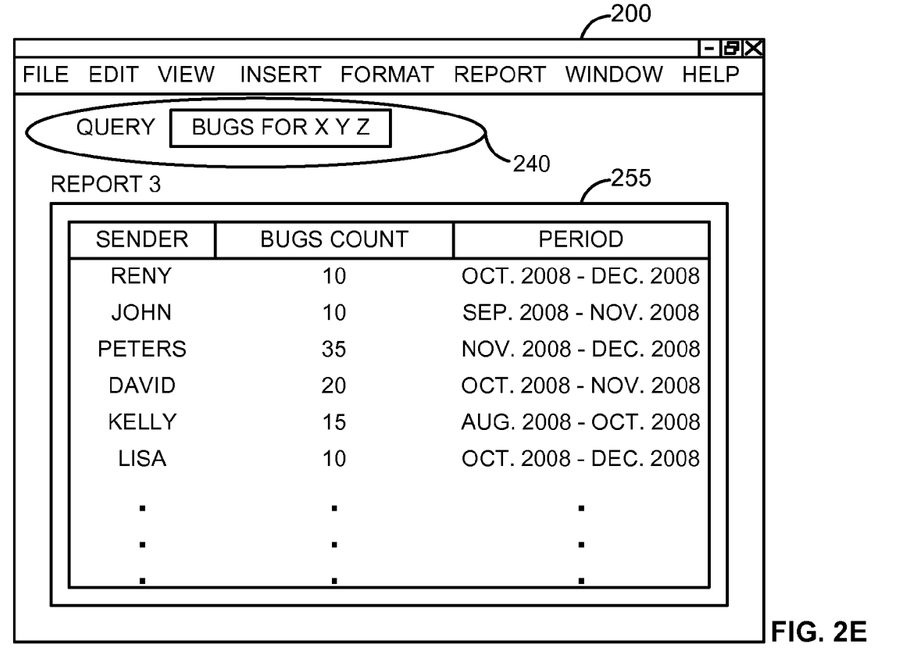

FIG. 2A illustrates an exemplary screen display of a mailbox server, including a set of emails and corresponding attributes of the emails, according to an embodiment of the invention. FIG. 2B illustrates an exemplary relationship map, according to an embodiment of the invention. FIGS. 2C, 2D and 2E illustrate exemplary screen displays of a relationship map created based upon attributes of emails, according to an embodiment of the invention. User interface 200 illustrates exemplary methods and systems of the present invention. User interface 200 typically provides an interface for a user to interact with a machine. Behavior of the user interface 200 may be governed by computer-executable instructions that are executed as the user interacts with the user interface 200. User interface 200 in FIG. 2A displays a set of emails available in a mailbox server. Metadata of the emails present in the mailbox server is configured. The metadata includes one or more attributes for each email. Each attribute includes one or more dimensions and corresponding one or more measures associated with the email. Some of the dimensions may include details of the sender of an email, denoted as "from" 210, "subject" of the email 215, mailbox organization details such as a folder to which a set of emails containing a particular subject is classified into, denoted as "deal XYZ" 205.

Based upon the attributes of the emails, a relationship map is created. The relationship map is a multidimensional structure, including multiple axes, with each axis describing an attribute of the emails. A query may be entered by a user to query the mailbox. The query entered by the user is parsed to identify one or more relevant emails associated with the entered query. The received query is parsed to identify attributes of one or more relevant emails associated with the received query. The relevant emails are identified based upon an association of the attributes present in the relationship map with the received query. Based upon the received query, a value is computed for each attribute of the relevant emails present in the relationship map. This is achieved by computing a value for each dimension and corresponding measure of each relevant email. Based upon the value computed, a resulting report, including an analytical view of information present in the relevant emails, is rendered.

FIG. 2B illustrates an exemplary relationship map, which is a three-dimensional structure, such as a cube. The cube represents data available to a user in various dimensions. Each axis in the cube represents the attributes of the relevant emails, for example, x-axis represents sender 225, y-axis represents bug count 220, and z-axis represents report date 230. These attributes of the relevant emails include details of the dimensions that the attributes are representing. For instance, for a particular business scenario of counting the number of mails received on bug XYZ, x-axis represents details of various senders who have sent emails related to bugs, y-axis represents a count of various bugs that have been reported, and z-axis represents the date on which the bugs were reported. Co-ordinates of each cell present in the cube describe the dimensions of the attribute. For example, cell 235 representing the coordinates (B4, Sn, Dn) describes the dimensions of the attributes as: bug count "B4" reported by sender "Sn" on date "Dn". An online analytical processing (OLAP) application may be used to obtain information from the cube. The relevant emails are identified based upon an association of the attributes present in the relationship map with the received query. Based upon the received query, a value is computed for each attribute of the relevant emails present in the relationship map. This is achieved by computing a value for each dimension and corresponding measure of each relevant email. Based upon the value computed, a resulting report, including an analytical view of information present in the relevant emails, is rendered.

FIGS. 2C, 2D and 2E illustrate exemplary resulting reports that are rendered by values computed to attributes in the relationship map. User interface 200 may display the resulting report as a bar graph, that is created based upon the values computed to the relationship map of FIG. 2B. Query 240 received from a user is parsed to identify one or more relevant emails associated with query 240. Based upon the terms "BUGS FOR XYZ" in query 240, the relevant emails are identified. A value is computed for each attribute of the relevant emails. Based upon the computed value, the relationship map (for example, cube in FIG. 2B) is updated. Based upon the values computed in the relationship map, a resulting report (for example, FIG. 2C, 2D, 2E) having an analytical view of information present in one or more emails is generated.

In FIG. 2C, resulting report 245 is generated based upon the values computed in the relationship map. Resulting report 245 includes an analytical view of the information present in the relationship map shown in FIG. 2B. Resulting report 245 includes bug counts for a project XYZ and corresponding senders of bug report for project XYZ. For example, in resulting report 245, sender "DAVID" has sent a total of "20" bug reports. In FIG. 2D, resulting report 250 is generated based upon the values computed in the relationship map. Resulting report 250 includes an analytical view of the information present in the relationship map shown in FIG. 2B. Resulting report 250 includes bug counts for a project XYZ and corresponding senders of bug report for project XYZ. For example, in resulting report 250, sender "PETERS" has sent a maximum number of bug reports.

In FIG. 2E, resulting report 255 is generated based upon the values computed in the relationship map. Resulting report 255 includes an analytical view of the information present in the relationship map shown in FIG. 2B. Resulting report 255 includes bug counts for a project XYZ, corresponding senders of bug report for project XYZ along with the period in which such a report was sent. For example, in resulting report 255, sender "RENY" has sent a total of "10" bug reports, in the period "OCT 2008-DEC 2008". By looking at resulting report (for example 245, 250, 255), an analytical view of the information present in the relevant emails can be established. Without the analytical view, each of the relevant emails has to be analyzed, classified, searched and a report has to be created based upon the acquired information.

Figure 3A:
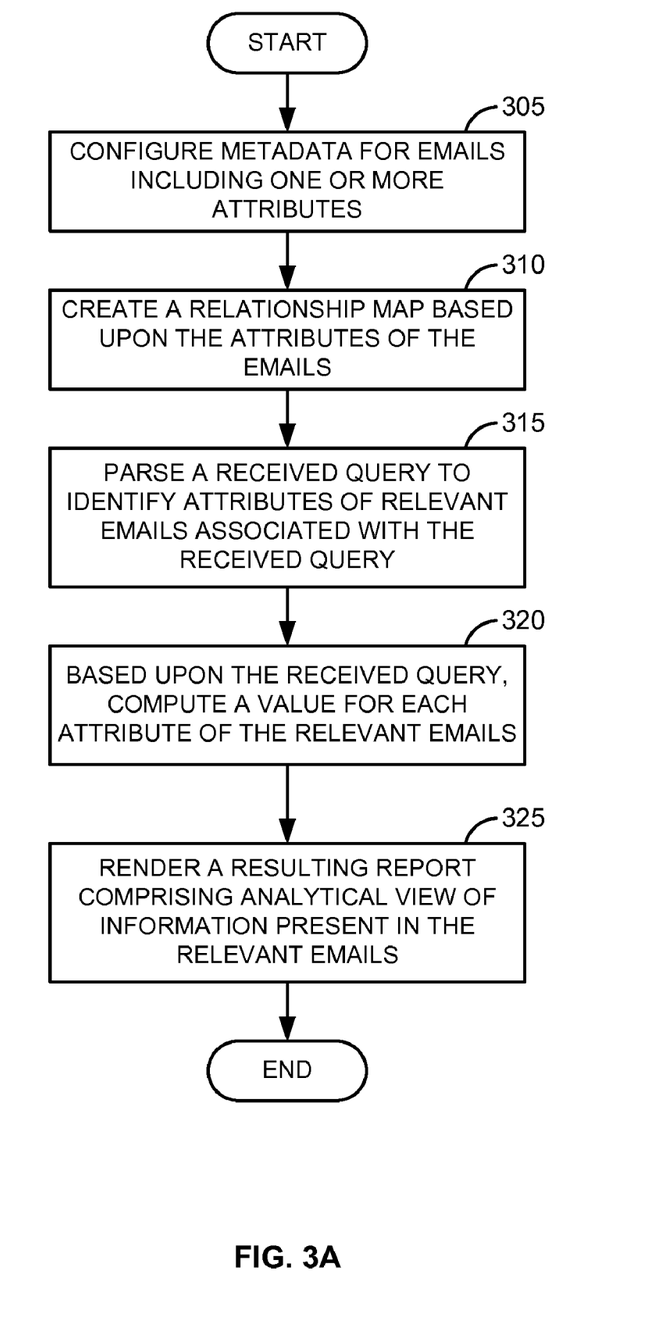
FIG. 3A illustrates a flow diagram of an exemplary method for providing an analytical view of information present in one or more emails, according to an embodiment of the invention.

FIG. 3A illustrates a flow diagram of an exemplary method for providing an analytical view of information present in one or more emails, according to an embodiment of the invention. The emails are typically stored in a mailbox server. In process block 305, metadata is configured for the emails present in a mailbox. The metadata includes one or more attributes of the emails, which describe one or more dimensions and corresponding one or more measures associated with the emails. In process block 310, a relationship map is created, based upon the attributes of the emails. The relationship map is a multi-dimensional structure, including multiple axes, with each axis describing an attribute of the emails. In process block 315, a received query is parsed to identify attributes of one or more relevant emails associated with the received query. The relevant emails are identified based upon an association of the attributes present in the relationship map with the received query. In process block 320, based upon the received query, a value is computed for each attribute of the relevant emails present in the relationship map. This is achieved by computing a value for each dimension and corresponding measure of each relevant email. In process block 325, based upon the value computed, a resulting report including an analytical view of the information about the relevant emails is rendered.

Figure 3B:
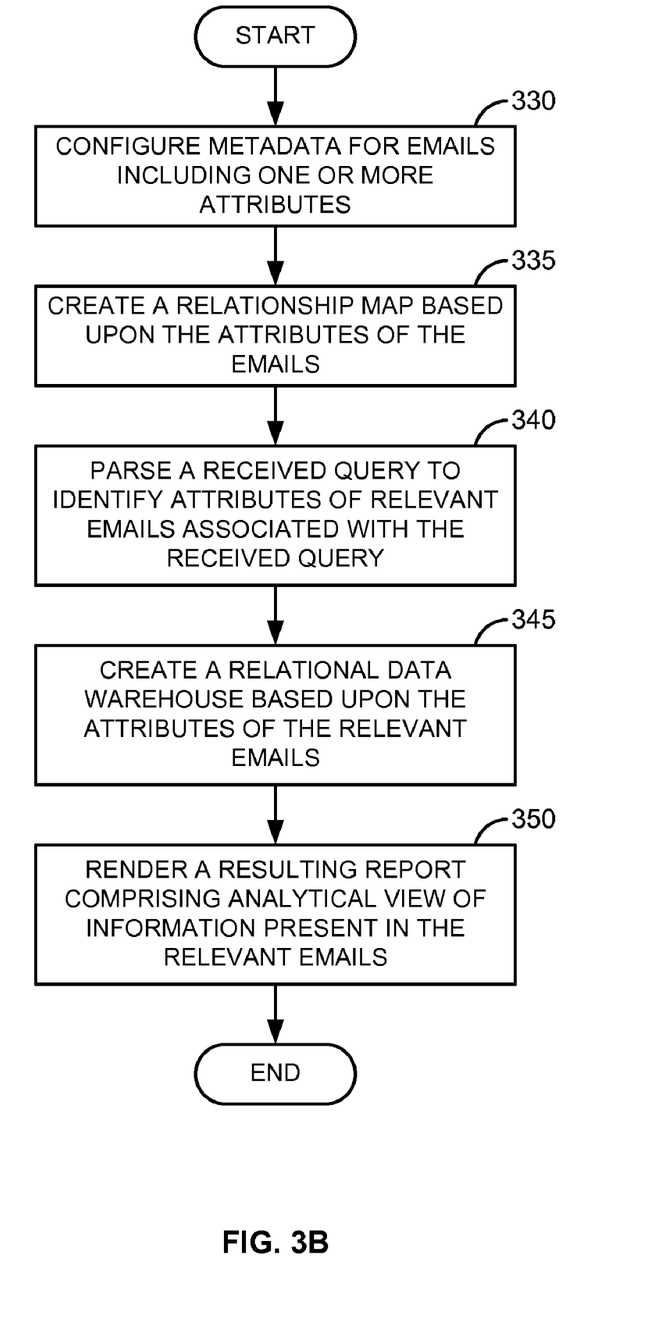
FIG. 3B illustrates a flow diagram of an exemplary method for providing an analytical view of information present in one or more emails, according to an embodiment of the invention.

FIG. 3B illustrates a flow diagram of an exemplary method for providing an analytical view of information present in one or more emails, according to an embodiment of the invention. The emails are typically stored in a mailbox server. In process block 330, metadata is configured for the emails present in a mailbox. The metadata includes one or more attributes of the emails, which describe one or more dimensions and corresponding one or more measures associated with the emails. In process block 335, a relationship map is created, based upon the attributes of the emails. The relationship map is a multi-dimensional structure, including multiple axes, with each axis describing an attribute of the emails. In process block 340, a received query is parsed to identify attributes of one or more relevant emails associated with the received query. The relevant emails are identified based upon an association of the attributes present in the relationship map with the received query. In process block 345, a relational data warehouse is created based upon the attributes of the relevant emails. The relational data warehouse represents a structural distribution of attributes of the relevant emails. In process block 350, based upon the attributes of the relevant emails in the relational data warehouse, a resulting report including an analytical view of the information about the relevant emails is rendered.

Figure 4:
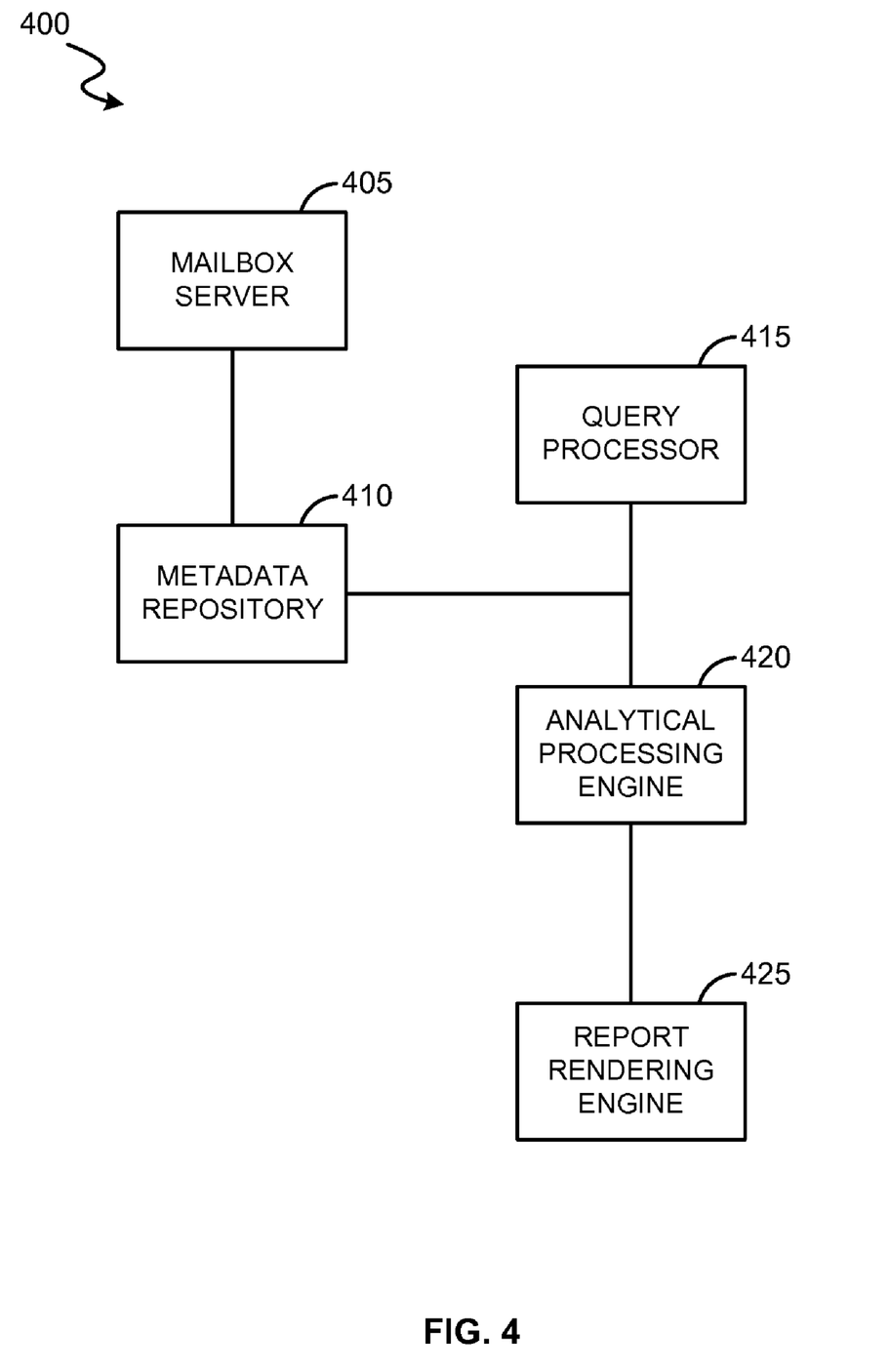
FIG. 4 illustrates a block diagram of an exemplary system for providing an analytical view of information present in one or more emails, according to an embodiment of the invention.

FIG. 4 illustrates a block diagram of an exemplary system for providing an analytical view of information present in one or more emails, according to an embodiment of the invention. System 400 includes system components like mailbox server 405, metadata repository 410, query processor 415, analytical processing engine 420 and report rendering engine 425. In an embodiment, mailbox server 405 is in communication with metadata repository 410. Metadata repository 410 is in communication with query processor 415. Query processor 415 is in communication with analytical processing engine 420. Analytical processing engine 420 is in communication with report rendering engine 425.

System 400 provides an analytical view of information present in the emails. The emails of a user are stored in mailbox server 405. Metadata repository 410 configures metadata of the emails present in mailbox server 405 and stores the metadata of the emails. The metadata includes one or more attributes for each email. Each attribute includes one or more dimensions and corresponding one or more measures associated with the emails present in mailbox server 405. Analytical processing engine 420 creates a relationship map based upon the attributes configured for the emails, and stores the relationship map in analytical processing engine 420. In an embodiment, analytical processing engine 420 maps the values of the attributes of the relevant emails to create a relationship map. The relationship map is a multidimensional structure, including multiple axes, with each axis describing an attribute of the emails. A user may enter a query to query the mailbox. The query typically has information relating to the emails in mailbox server 405. Query processor 415 parses the received query to identify one or more relevant emails stored in metadata repository 410 based upon the query. The relevant emails are identified based upon an association of the attributes present in the relationship map with the query.

Analytical processing engine 420 computes a value for each attribute of the relevant emails present in metadata repository 410. The values computed may be informed to analytical processing engine 420, which in turn may update the relationship map. Based upon the values computed for each attribute present in the relationship map, report rendering engine 425 renders a resulting report. This resulting report having an analytical view of information present in the relevant emails, is provided to the user. The information thus presented is easily available for the user to understand and to use.

In an embodiment, analytical processing engine 420 presents the metadata of the relevant emails as a relational data warehouse. The relational data warehouse represents a structural distribution of the attributes of the relevant emails. The metadata of the relevant emails are broken down into attributes including dimensions and corresponding measures for each email, and mapping the attributes to form the relational data warehouse. Based upon the relational data warehouse, report rendering engine 425 renders the resulting report. The result report may be made available to the user on a user interface.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a tangible machine-readable medium for storing the machine-executable instructions. The tangible CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims, which follow.

What is claimed is:

1. A non-transitory machine readable storage medium comprising instructions which when executed by the machine cause the machine to perform operations comprising:
    configuring metadata for one or more emails, the metadata including one or more attributes of the emails, the attributes describing one or more dimensions and corresponding one or more measures associated with the emails;
    based upon the attributes of the emails, creating a relationship map, the relationship map being a multidimensional structure including multiple axes, with each axis describing an attribute of the emails;
    parsing a received query to identify attributes of one or more relevant emails associated with the received query, the relevant emails being identified based upon an association of the attributes present in the relationship map with the received query;
    based upon the received query, computing a value for each attribute of the relevant emails present in the relationship map by
        computing a value for each dimension and corresponding measure of the relevant emails and
        aggregating the measures of one or more dimensions having one or more identical values; and
    based upon the values computed for each attribute present in the relationship map, rendering a resulting report comprising analytical view of information present in the relevant emails.

2. The non-transitory machine readable storage medium of claim 1, wherein computing values for the attributes of each email comprises recognizing one or more quantities defined for each attribute of each email.

3. The non-transitory machine readable storage medium of claim 1, wherein configuring metadata of each of the emails comprises recognizing metadata that is inherent to the emails.

4. The non-transitory machine readable storage medium of claim 1, wherein configuring metadata of each of the emails comprises defining metadata of the emails by analyzing contents of the emails.

5. The non-transitory machine readable storage medium of claim 1 further comprises updating the relationship map by identifying the values described for each attribute in the emails, and mapping the identified values on corresponding axes of the multidimensional structure, that represent the attribute in the relationship map.

6. The non-transitory machine readable storage medium of claim 1, wherein identifying the attributes of the one or more relevant emails further comprises extracting the attributes from the relevant emails 7. The non-transitory machine readable storage medium of claim 1, wherein identifying the attributes of the one or more relevant emails further comprises extracting the attributes from the metadata configured for the emails.

8. The non-transitory machine readable storage medium of claim 1 further comprises creating an online analytical processing (OLAP) cube, based upon the values of the relationship map.

9. A non-transitory machine readable storage medium comprising instructions which when executed by the machine cause the machine to perform operations comprising:
    configuring metadata for one or more emails, the metadata including one or more attributes of the emails, the attributes describing one or more dimensions and corresponding one or more measures associated with the emails;
    based upon the attributes of the emails, creating a relationship map, the relationship map being a multidimensional structure including multiple axes, with each axis describing an attribute of the emails;
    parsing a received query to identify attributes of one or more relevant emails associated with the received query, the relevant emails being identified based upon an association of the attributes present in the relationship map with the received query;
    creating a relational data warehouse based upon the attributes of the relevant emails, by
        analyzing the metadata of the relevant emails into one or more attributes, the attributes including dimensions and corresponding measures for each email, and
        mapping the attributes to form the relational data warehouse by performing an aggregation of one or more dimensions and corresponding measures along each axis of the relational data warehouse, the relational data warehouse representing a structural distribution of attributes of the relevant emails; and based upon the relational data warehouse, rendering a resulting report comprising analytical view of information present in the relevant emails.

10. The non-transitory machine readable storage medium of claim 9, wherein creating the relational data warehouse comprises creating a conceptual view of information present in the attributes of the relevant emails.

11. A computer system to provide an analytical view of information present in one or more emails, comprising:
- a mailbox server, to store the emails;
- a metadata repository in communication with the mailbox server, to configure metadata of the emails in the mailbox server based upon a received query and storing the metadata of the emails, the metadata describing one or more attributes of each email;
- an analytical processing engine in communication with the metadata repository, to create a relationship map by mapping each attributes of the relevant emails;
- a query processor in communication with the metadata repository, to parse the received query, for identifying one or more relevant emails based upon terms present in the query, the query having information relating to the emails;
- the analytical processing engine in communication with the query processor and the metadata repository, to compute a value for each attribute of the relevant emails, and aggregating the measures of one or more dimensions having one or more identical values; and
- a report rendering engine in communication with the analytical processing engine, to render a resulting report based upon the values computed for the attributes in the relationship map, the resulting report comprising an analytical view of information present in the relevant emails.

12. The computer system of claim 11, wherein the analytical processing engine computes values for the attributes of each relevant email and maps the values of the attributes of the relevant emails to create the relationship map.

13. The computer system of claim 11, wherein the analytical processing engine presents metadata of the relevant emails as a relational data warehouse, the relational data warehouse representing a structural distribution of the attributes of the relevant emails.

14. The computer system of claim 11, wherein the relationship map comprises a multidimensional structure having multiple axes, with each axis describing an attribute of the relevant emails, the multidimensional structure having an analytical view of information about the attributes of the relevant emails.

15. A computer implemented method for providing an analytical view of information present in one or more emails, the method comprising:
- configuring metadata for each of the emails, the metadata including one or more attributes of the emails, the attributes describing one or more dimensions and corresponding one or more measures associated with the emails;
- based upon the attributes of the emails, creating a relationship map, the relationship map being a multidimensional structure including multiple axes, with each axis describing an attribute of the emails;
- parsing a received query to identify attributes of one or more relevant emails associated with the received query, the relevant emails being identified based upon an association of the attributes present in the relationship map with the received query;
- based upon the received query, computing a value for each attribute of the relevant emails present in the relationship map by
  - computing a value for each dimension and corresponding measure of the relevant emails, and
  - aggregating the measures of one or more dimensions having one or more identical values; and
- based upon the values computed for each attribute present in the relationship map, rendering a resulting report comprising analytical view of information present in the relevant emails.

16. A computer implemented method for providing an analytical view of information present in one or more emails, the method comprising:
- configuring metadata for each of the emails, the metadata including one or more attributes of the emails, the attributes describing one or more dimensions and corresponding one or more measures associated with the emails;
- based upon the attributes of the emails, creating a relationship map, the relationship map being a multidimensional structure including multiple axes, with each axis describing an attribute of the emails;
- parsing a received query to identify attributes of one or more relevant emails associated with the received query, the relevant emails being identified based upon an association of the attributes present in the relationship map with the received query;
- creating a relational data warehouse based upon the attributes of the relevant emails, by
  - analyzing the metadata of the relevant emails into one or more attributes, the attributes including dimensions and corresponding measures for each email, and
  - mapping the attributes to form the relational data warehouse by performing an aggregation of one or more dimensions and corresponding measures along each axis of the relational data warehouse, the relational data warehouse representing a structural distribution of attributes of the relevant emails; and
- based upon the relational data warehouse, rendering a resulting report comprising analytical view of information present in the relevant emails.

* * * * *